R. B. HUGUNIN.

Sash-Holders.

No. 5,559. Reissued September 2, 1873.

Attest;
Jno. D. Patten
W. S. Miller

Inventor;
R. B. Huguinin

AM. PHOTO-LITHOGRAPHIC Co. N.Y. (OSBORNE'S PROCESS)

UNITED STATES PATENT OFFICE.

ROBERT B. HUGUNIN, OF NEW YORK, N. Y.

IMPROVEMENT IN SASH-HOLDERS.

Specification forming part of Letters Patent No. 137,682, dated April 8, 1873; reissue No. 5,559, dated September 2, 1873; application filed July 14, 1873.

*To all whom it may concern:*

Be it known that I, ROBERT B. HUGUNIN, of New York, county and State of New York, have invented a new Roller Sash-Holder, of which the following is a specification:

Attached to the securing-plate is an arm with a roller operated by a spring back of the roller. In the opening of the arm is the double-armed balance-clamp arranged on a bearing, so as to allow its two ends a limited longitudinal motion within and independent of the arm, the object being to prevent undue binding of the roller in raising the sash, and, when the roller works back into the arm, by the wear of its bearings, to enable the upper end of the balance-clamp to move back with it. The lower end rises at the same time with the roller, taking up the space in the working parts caused by wear of bearings, and preventing the roller with the sash from dropping to a holding position after the hand has been removed. The weight of the sash, when at rest, is carried through the roller to the lower arm of the balance-clamp, causing the upper arm to compress the roller against the sash with a similar force, preventing it from turning, and, with the spring, furnishing the holding pressure. By the different leverages of the roller-bearings, resting first on the arm, as in raising the sash, then transferred to the balance-clamp bearing when at rest by the longitudinal movement of the balance-clamp, different pressures from the same spring are obtained in raising and holding the sash. The second part of my invention relates to projections on the arm and plate, and the use of a spring working against the pin hinging the arm to the plate as a fulcrum, and resting against the arm and a projection on the plate, the object being to obtain efficiency and exactness in drilling and the manufacture, and an efficient spring, and to prevent injuring the spring by a too great opening of the arm.

Figure 1:
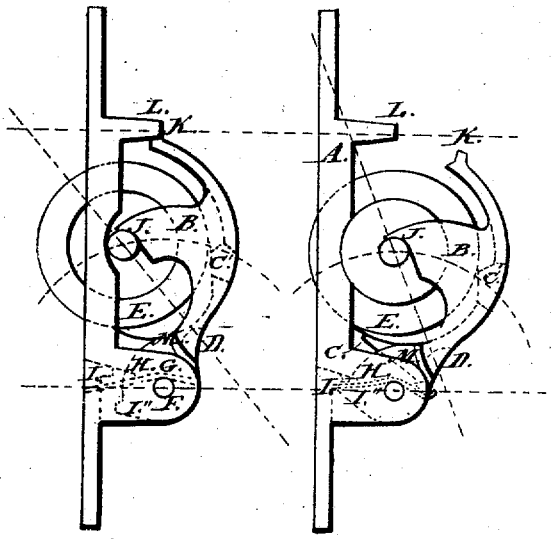
Figure 2:
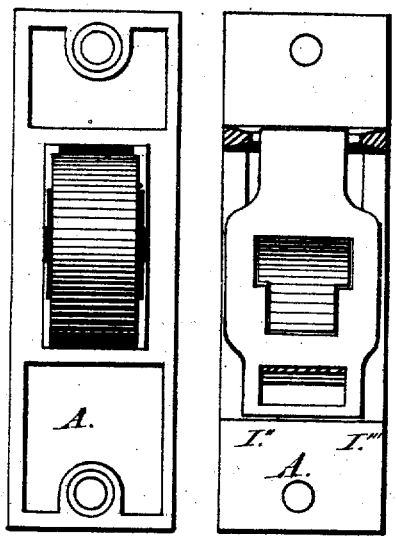
Figure 4:
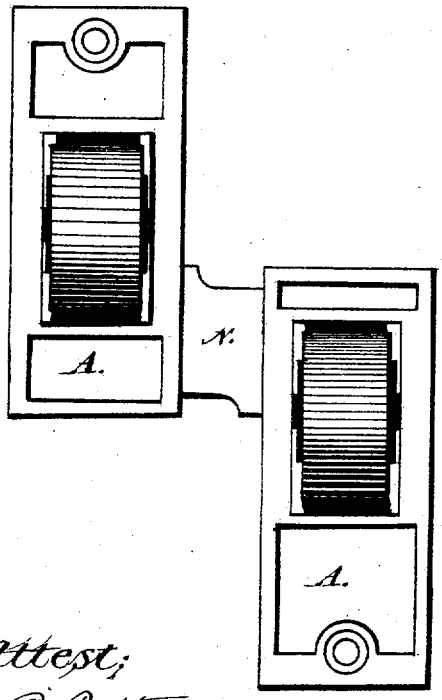
Figure 3:
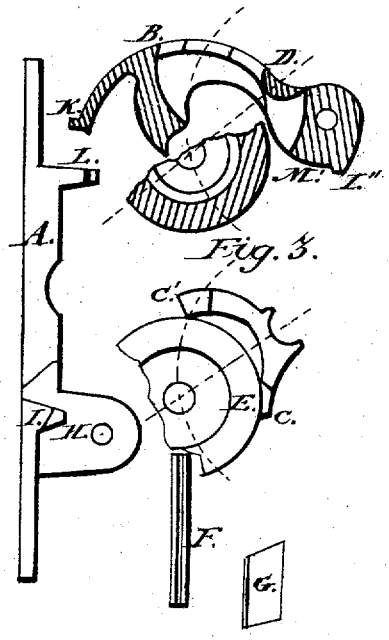

Figure 1 is a side elevation embodying my inventions. Fig. 2 is a plan view of the same. Fig. 3 is a detailed view of the working parts. Fig. 4 is a double plate embodying my inventions.

A is a metal plate for securing the working parts to the casing, and is made either double or single, as shown in Figs. 2 and 4, and of sizes adapted to house or car windows. B is an arm attached to plate A and operated by a spring. It contains a roller and an open space underneath and back of the roller for the admission and working of the balance-clamp. C C′ is the balance-clamp, so called from its manner of working. It is suspended in the opening of arm B near its center between its two ends, arranged on a bearing, and has a limited longitudinal motion independent of arm B, which enables it to work freely over the surface of the roller in raising the sash. On removing the hand the roller is at once arrested by the lower arm, and the weight of the sash, reacting upon the upper arm by means of the pivot, compresses it forward with the roller against the sash, preventing the roller from turning while holding or lowering, and, with the assistance of the spring, furnishing the holding pressure against the sash. The balance-clamp may have either a concave or convex surface to correspond with the pivot-hinge. In lowering the sash the unpainted edges slide down over the rollers, the springs yielding when any tendency to rigid binding occurs. D is a bearing, on which the balance-clamp works. It is situated within the opening of arm B. This bearing is for the roller while holding and lowering the sash. E is a semi-elastic covered metal roller, suspended in arm B over and forward of the balance-clamp. F is a hinge-pin for securing the arm B to plate A, and acting as a fulcrum to the spring resting against it and a projection on plate A. The upper end of the spring bears against the arm B above the hinge-pin F. G is a steel spring, properly tempered, and working in manner and place before described. H is a spring-holding projection on plate A, situated between the lugs and nearly under the hinge-pin F. It is used as before described. I I′ and I″ I‴ are projections on plate A and arm B, preventing the careless opening of arm B so as to endanger the efficiency of the spring. J J′ are the roller-bearings on the arm B while raising the sash. The bearing of the roller on the arm is transferred to the balance-clamp bearing when the sash is at rest or being lowered, as before described. K is a projecting end on arm B, useful in protecting the working parts and roller from being clogged with loose material dropping down within the casing from the jarring incidental in raising and lowering the sashes. L is a projecting rest on plate A for end K of arm B; M M, bearings on arm B, resting on projections I I′, plate A. These, with the projections K and L, give uniform positions to the arm and plate with reference to each other during the process of drilling them through together for the hinge-pin F. The curves of the bearings M M′ swing clear over the projections I I′ when the plate and arm are hinged together. N is the connecting-strip between the plates A A′, Fig. 4. This strip is covered, when the plate is in the casing, by the center stop-piece between the sashes.

The double plate possesses some advantages for new work, as well as a saving of fastening-screws. It is adapted to car-windows with sliding blind combined with the sash.

I claim as my invention—

1. In combination with a sash-holder having a roller and an arm operated by a spring, a double-armed balance-clamp, C C′, substantially as described.

2. The combination of a roller and arm operated by a spring with the double-armed balance-clamp C C′, being an independent piece working on a bearing in the rear of the roller, substantially as and for the purposes specified.

3. The projecting end K of arm B, in combination with the projection L on plate A, substantially as and for the purposes specified.

4. The combination of spring G, pin F, and spring-holding projection H on plate A, substantially as and for the purposes specified.

5. The combination of a projection, I, on plate A with a projection, I″, and a bearing, M, on arm B, substantially as and for the purposes specified.

R. B. HUGUNIN.

Witnesses:
JNO. D. PATTEN,
H. S. MILLER.